United States Patent

[11] 3,568,822

[72] Inventors  Robert D. Conkey
 West Vancouver, British Columbia;
 Rupert H. Clement, Richmond, British Columbia, Canada
[21] Appl. No. 792,474
[22] Filed Jan. 21, 1969
[45] Patented Mar. 9, 1971
[73] Assignee Canada Chain and Forge Company Ltd.
 Granville Island, Vancouver, Canada

[54] CONVEYOR CHAIN
 3 Claims, 4 Drawing Figs.

[52] U.S. Cl..................................................... 198/183
[51] Int. Cl.............................................. B65g 17/24
[50] Field of Search............................................ 198/183, 185, 189, 200

[56] References Cited
UNITED STATES PATENTS

| | | | |
|---|---|---|---|
| 1,641,642 | 9/1927 | Pangborn..................... | 198/183 |
| 1,745,192 | 1/1930 | Shafer......................... | 198/183 |

Primary Examiner—Robert G. Sheridan
Attorney—Lyle G. Trorey

ABSTRACT: A conveyor chain formed of pintle-connected links wherein alternate links of the chain carry elongated roller assemblies having rollers extending longitudinally of the direction of travel of the chain and forming a supporting surface for objects to be transported and wherein each assembly is positioned on its carrying link so as to extend over and thereby be supported by a link immediately in advance of its carrying link when the chain extends in a straight line condition.

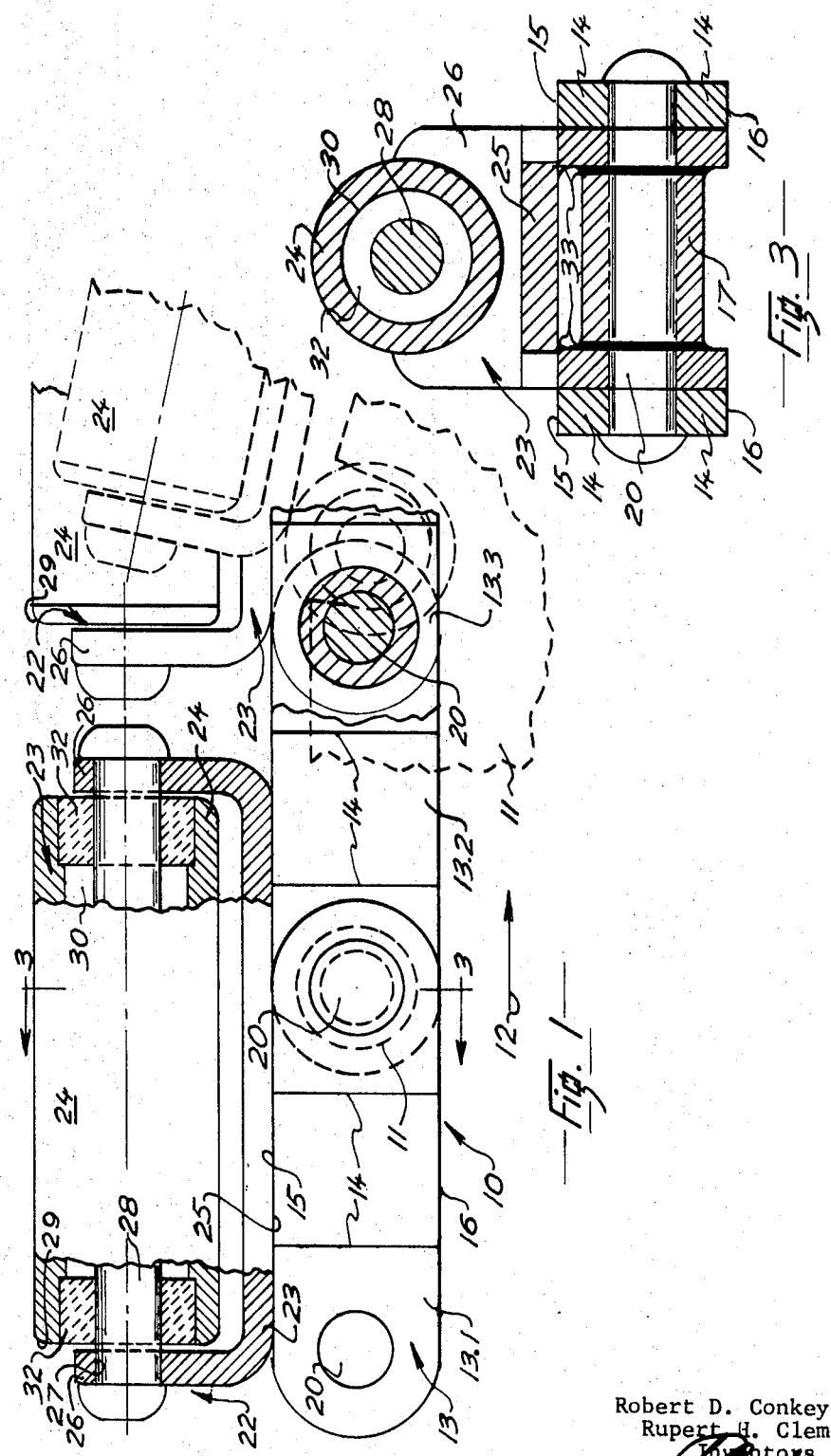

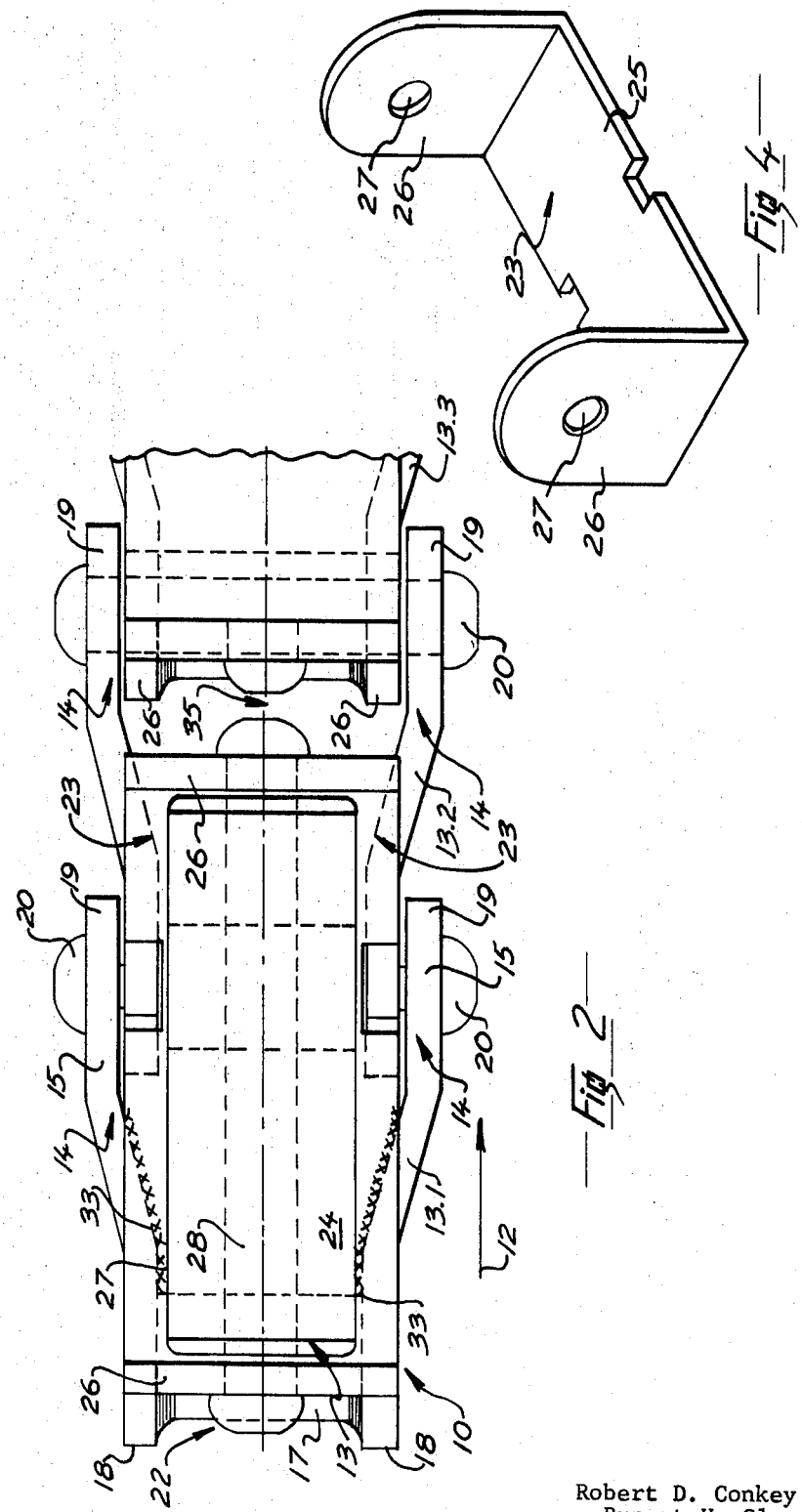

CONVEYOR CHAIN

BACKGROUND OF THE INVENTION

This invention relates to chain conveyors which are provided with longitudinally arranged rollers constituting a supporting surface for objects conveyed by the chain.

This type of chain is commonly used in a lumber mill and the like for transporting sawn lumber from point to point and wherein it is necessary to withdraw the lumber in a direction which is substantially at right angles to the direction of travel of the chain.

It is appreciated that many and varied arrangements of this type of conveyor chain have heretofore been devised. In some arrangements the rollers are connected to each link of the chain whereas in others the rollers are carried by alternate links and are cantilevered over the links adjacent, so as to form a substantially continuous supporting surface broken only by the space between adjacent rollers. In the last-mentioned type of roller chains commonly termed rolltop chains some have been designed so that the rollers are cantilevered over both the fore and aft pivoted connections of the carrying links with the links immediately in advance of and following the latter. The carrying surfaces of all rollers will lie in the same plane. However when the chain reaches a point at which it must return over sprockets or the like, the trailing ends of the rollers, as the rollers change direction, will lift upwardly above the general plane of the rollers in that portion of the chain extending in a straight line condition and very frequently, therefore, damage the objects being carried by the chain.

In some chains of this last-mentioned type the rollers have been cantilevered over only the link in advance of the carrying link so that the trailing ends of the rollers, as the chain passes over a return sprocket of the like, will not tip upwardly to damage objects carried by the chain. In this type of chain, however, the supporting structure carrying the rollers extends freely over and in unsupported relationship to the link in advance of the carrying link. As the cantilevered portion of the rollers must be almost as long as the links in advance of the carrying links in order to make the space between adjacent rollers as small as possible, weighty objects supported on said cantilevered portions can cause the roller-carrying links to be tilted out of a straight line condition with respect to the links adjacent thereto. This can, therefore, result in damage to objects transported by the chain.

The supporting structures of the rollers of the last-mentioned type of chain, due to the high stresses which may be set up, when the cantilever portions are subjected to heavy loads, must be of relatively heavy construction. This construction is not only relatively expensive respecting manufacture but results in a relatively heavy conveyor chain which is difficult to handle and which requires excessive power for its operation.

The conveyor chain of the present invention is designed to overcome the disadvantages of the last-mentioned type of chain. The present conveyor chain includes roller assemblies which are connected to alternate links of the chain and which overhang the links immediately in advance of the roller carrying links. However the assemblies are so designed that with the chain in a straight line condition they are supported not only by the links to which they are connected but by the links immediately in advance thereof, thereby permitting the roller assemblies to be fabricated of relatively light parts.

Furthermore tipping of a roller assembly and the link to which it is connected by the weight of a load on the overhanging or cantilevered portion thereof is effectively eliminated.

The conveyor chain of the present invention is formed of a plurality of pintle-connected links, having longitudinally extending roller assemblies mounted on alternate links which extend over the links in advance of the links on which they are mounted, each said roller assembly including an elongated roller and a base structure rotatably supporting the roller for rotation about an axis parallel to the direction travel of the chain, said base structure being arranged on its carrying link so as to engage, and be supported by, the link advance thereof when chain is extended in a straight line condition.

BRIEF DESCRIPTION OF THE DRAWINGS

FIG. 1 is a side view of a section of one form of a chain embodying my invention, FIG. 2, appearing on sheet 2 of the drawings is a top plan view of a section of the chain of FIG. 1, FIG. 3 is a sectional view taken on line 3–3 of FIG. 1, FIG. 4 is an isometric view of a supporting base of a roller assembly.

DESCRIPTION OF PREFERRED EMBODIMENT

Referring to the drawings, and in particular to FIGS. 1 and 2 thereof, there are shown fragments or portions of a conveyor chain 10 which includes features of invention. The fragments of the chain shown constitute an upper run portion of an endless conveyor chain which operates over head and foot sprockets (foot sprockets only being shown in dotted lines in FIG. 1 and accorded the numeral 11 for identification). The conveyor chain is driven by suitable means, not shown, so that the upper run travels in the direction as indicated by the arrow 12.

Chain 10 is formed of a plurality of identical links 13 three of which are shown in FIGS. 1 and 2 and accorded the reference numeral 13.1, 13.2 and 13.3 for identification. Each link is formed of a pair of side bars 14–14 which are of the same width from end to end and have parallel upper 15 and lower 16 surfaces. These side bars are connected by tubular end bars 17 which extend between a pair of adjacent ends 18 of said side bars. The end bars 17 are nonrotatably connected to their associated side bars by welding or the like so that the upper and lower surfaces 15 and 16 of the latter extend in a common plain. The ends 19 of the side bars opposite the ends 18 thereof lie in freely spaced-apart relationship.

Successive links of the chain are united by pintles 20 that pass through centrally located perforations through the ends 19 of the side bars and through the tubular end bars of connected links, in a well known manner as illustrated in the drawings.

Mounted on alternate links of the chain are roller assemblies 22 each of which include a supporting base 23 and an elongated roller 24. As illustrated in the drawings particularly in FIG. 4, the supporting base is U-shaped and includes an elongated flat base portion 25 which is substantially the same width as the link width, and upstanding end portions 26. The end portions 26 are provided with apertures 27 through which a pin 28 is passed, said pin being swedged or riveted at its ends. The roller 24 is mounted on the pin 28. The roller is elongated, having a bore 30 for the passage of the pin 28, said bore being counterbored at each end to receive bushings 32 which rotatably embrace the pin 28. As clearly shown in FIGS. 1 and 2 the roller assemblies 22 are materially longer than the chain links.

Referring to FIGS. 1 and 2 it will be seen that links 13.1 and 13.3 each carry a roller assembly 22. The roller assembly 22, mounted on link 13.1, is arranged so that the supporting base 23 extends longitudinally of and centrally of the latter and is positioned so that the trailing end 29 of the roller 24 (relative to the direction of travel of the chain) is positioned on or very slightly in advance of the axis of pintle 20 connecting link 13.1 to the following link. The base portion 25 of the supporting base 23 fits flush against the side bars 14–14 of link 13.1 and is rigidly secured to the latter as by welding at 33–33. As the roller assembly is materially longer than the link 13.1 the supporting base 23 and roller 24 extend forwardly over the side bars 14–14 of link 13.2. A roller assembly is also positioned on the link 13.3 in the manner as hereinbefore described, slightly in advance of and spaced from the roller assembly on link 13.1 so as to provide a clearance 35.

In use the conveyor chain, as previously described, passes over head and tail sprockets, its upper run being supported by a horizontal track, not shown, on which the lower surfaces 16 of the links ride. The upper run of the chain therefore will extend in a straight line condition, as illustrated in solid lines in FIG. 1, and as the roller assemblies are identical the longitudinal axes of the pins 28 will be aligned with each other as will the upper peripheral surfaces of the rollers. As the base portions of the base structures are flush and rest upon the side bars of the links to which they are connected, they will, consequently, extend over and rest upon the corresponding side bars of the link immediately in advance thereof when the chain is extended in a straight line condition. It will be apparent therefore, that a weight imposed by a load on any roller will be transmitted, to the link upon which the roller is mounted and the link in advance thereof. As links are supported in a straight line condition by the track upon which they ride the rollers will not tie or tilt under vertical loading.

The positioning of each roller assembly so that trailing end thereof is slightly in advance of the pivotal axis of the link upon which it is mounted, with the links following, will, when the chain starts to pass over the foot sprocket 11, as indicated in dotted lines in FIG. 1, resulting in the trailing end of each roller following a downwardly directed arcuate path as the link to which it is mounted starts to deflect from a straight line condition.

It will be seen that the conveyor chain as herein described provides a straight level supporting surface for objects to be carried which is broken only by the spaces between successive rollers.

Furthermore as the supporting bases of each of the roller assemblies are each supported at one end by the link upon which they are mounted and at the other end by the link in advance thereof they will not be subjected to stresses to which they would ordinarily be subjected to if said supporting bases were to be supported only by the links on which they are mounted.

We claim:

1. A conveyor chain having pintle connected links (13), each link having side bars having flat parallel upper and lower surfaces, the chain including:
   a. roller assemblies (22) mounted on alternate links (13) of the chain;
   b. each roller assembly including a roller (24) and a base structure (23) in which the roller is mounted for rotation about an axis longitudinally of the chain; and
   c. each base structure having a flat under surface and being disposed so that its under surface extends over and rests on the upper surfaces of the side bars of a link immediately in advance of the link on which it is mounted so as to be supported by the link in advance when the chain is extended in a straight line.

2. Structure as defined in claim 1 wherein each supporting base is U-shaped having an elongated base portion and upturned end portions, said end portions having an elongated pin extending therebetween upon which the roller is mounted.

3. Structure as defined in claim 1 wherein the assembly is positioned on its carrying link so that the trailing end of each roller is positioned in advance of the pivotal connection of the link which it is mounted and the link trailing.